(12) United States Patent
Ramaswamy et al.

(10) Patent No.: US 11,120,835 B2
(45) Date of Patent: Sep. 14, 2021

(54) COLLAGE OF INTERESTING MOMENTS IN A VIDEO

(71) Applicant: Google LLC, Mountain View, CA (US)

(72) Inventors: Sharadh Ramaswamy, Sunnyvale, CA (US); Matthias Grundmann, San Jose, CA (US); Kenneth Conley, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/222,437

(22) Filed: Dec. 17, 2018

(65) Prior Publication Data

US 2019/0189161 A1    Jun. 20, 2019

Related U.S. Application Data

(62) Division of application No. 15/192,851, filed on Jun. 24, 2016, now Pat. No. 10,157,638.

(51) Int. Cl.
*G11B 27/034*  (2006.01)
*G11B 27/28*   (2006.01)
*G11B 27/34*   (2006.01)
*H04N 21/237*  (2011.01)
*H04N 21/845*  (2011.01)
*H04N 21/8549* (2011.01)

(52) U.S. Cl.
CPC .......... *G11B 27/034* (2013.01); *G11B 27/28* (2013.01); *G11B 27/34* (2013.01); *H04N 21/237* (2013.01); *H04N 21/8456* (2013.01); *H04N 21/8549* (2013.01)

(58) Field of Classification Search
CPC ....... G11B 27/034; G11B 27/28; G11B 27/34; H04N 21/237; H04N 21/8456; H04N 21/8549
See application file for complete search history.

(56) References Cited

U.S. PATENT DOCUMENTS

| 2003/0061610 A1* | 3/2003 | Errico ............... H04N 21/4755 725/46 |
| 2003/0095720 A1* | 5/2003 | Chiu ..................... H04N 5/262 382/284 |

(Continued)

FOREIGN PATENT DOCUMENTS

| CN | 101075258 | 11/2007 |
| CN | 103931199 | 7/2014 |
| CN | 105009599 | 10/2015 |

OTHER PUBLICATIONS

Shingo Uchihashi et al. "Video Manga: Generating Semantically Meaningful Video Summaries", Proceedings of the seventh ACM international conference on Multimedia (Part 1). ACM, pp. 383-392 (Year: 1999).*

(Continued)

*Primary Examiner* — Sunghyoun Park
(74) *Attorney, Agent, or Firm* — IP Spring

(57) ABSTRACT

A computer-implemented method includes determining interesting moments in a video. The method further includes generating video segments based on the interesting moments, wherein each of the video segments includes at least one of the interesting moments from the video. The method further includes generating a collage from the video segments, where the collage includes at least two windows and wherein each window includes one of the video segments.

20 Claims, 8 Drawing Sheets

(56) References Cited

U.S. PATENT DOCUMENTS

| | | | |
|---|---|---|---|
| 2005/0033758 | A1 | 2/2005 | Baxter |
| 2005/0200762 | A1 | 9/2005 | Barletta et al. |
| 2005/0220345 | A1 | 10/2005 | Chiu et al. |
| 2007/0058884 | A1 | 3/2007 | Rother et al. |
| 2007/0300258 | A1* | 12/2007 | O'Connor ............... A61Q 5/02 725/44 |
| 2008/0193016 | A1 | 8/2008 | Lim et al. |
| 2008/0306995 | A1* | 12/2008 | Newell ............... G11B 27/034 |
| 2009/0003712 | A1* | 1/2009 | Mei ............... G06K 9/00744 382/225 |
| 2011/0099514 | A1 | 4/2011 | Singhal et al. |
| 2012/0290931 | A1* | 11/2012 | Nurmi ............... G11B 27/105 715/716 |
| 2012/0297301 | A1 | 11/2012 | Mohoney et al. |
| 2013/0063668 | A1 | 3/2013 | Yamashita et al. |
| 2014/0063177 | A1 | 3/2014 | Tian et al. |
| 2014/0328570 | A1* | 11/2014 | Cheng ............... H04N 21/44008 386/241 |
| 2015/0269968 | A1* | 9/2015 | Matejka ............... G11B 27/102 386/241 |
| 2016/0170709 | A1 | 6/2016 | Jang et al. |
| 2016/0371815 | A1 | 12/2016 | Patankar et al. |
| 2017/0316256 | A1* | 11/2017 | Kim ............... G06K 9/00342 |
| 2018/0005037 | A1* | 1/2018 | Smith, IV ............... G10L 15/26 |

OTHER PUBLICATIONS

EPO, International Preliminary Report on Patentability for International Patent Application No. PCT/US2016/068129, dated Aug. 14, 2018, 17 pages.

EPO, Written Opinion of the International Preliminary Examining Authority for International Patent Application No. PCT/US2016/068129, dated May 24, 2018, 7 pages.

European Patent Office, International Search Report for International Patent Application No. PCT/US2016/068129, dated Mar. 8, 2017, 6 pages.

European Patent Office, Written Opinion for International Patent Application No. PCT/US2016/068129, dated Mar. 8, 2017, 7 pages.

Mei, et al., "Video collage: presenting a video sequence using a single image", The Visual Computer; International Journal of Computer Graphics, Springer, Berlin, DE, vol. 25, No. 1, Aug. 19, 2008, pp. 39-51.

Sun, et al., "The dynamic VideoBook: a hierarchical summarization for surveillance video", 2013 IEEE International Conference on Image Processing, IEEE, Sep. 15, 2013, pp. 3963-3966.

Uchihashi, et al., "Video manga: generating semantically meaningful video summaries", Proceedings of the seventh ACM international conference on Multimedia (Part 1). ACM, 1999, pp. 383-392.

USPTO, Notice of Allowance for U.S. Appl. No. 15/192,851, dated Aug. 9, 2018, 8 pages.

USPTO, Non-final Office Action for U.S. Appl. No. 15/192,851, dated Dec. 13, 2017, 13 pages.

USPTO, Restriction Requirement for U.S. Appl. No. 15/192,851, dated Oct. 6, 2017, 7 pages.

EPO, Communication Under Rule 71(3) EPC for European Patent Application No. 16829172.2, dated Feb. 26, 2020, 7 pages.

EPO, Communication Pursuant to Article 94(3) EPC for European Patent Application No. 16829172.2, dated Apr. 23, 2020, 6 pages.

CNIPA, First Office Action (with English translation) for Chinese Patent Application No. 201680083919.9, dated Aug. 31, 2020, 32 pages.

EPO, Communication Pursuant to Article 94(3) EPC for European Patent Application No. 16829172.2, dated Nov. 2, 2020, 6 pages.

CNIPA, Second Office Action for Chinese Patent Application No. 201680083919.9, dated Mar. 10, 2021, 27 pages.

EPO, Communication Pursuant to Article 94(3) EPC for European Patent Application No. 16829172.2, dated Mar. 11, 2021, 8 pages.

Leonardi, et al., "Semantic Indexing of Soccer Audio-Visual Sequences: a Multimodal Approach Based on Controlled Markov Chains", IEEE Transactions on Circuits and Systems for Video Technology, Institute of Electrical and Electronics Engineers, vol. 14, No. 5, May 1, 2004, pp. 634-643.

* cited by examiner

COLLAGE OF INTERESTING MOMENTS IN A VIDEO

CROSS-REFERENCE TO RELATED APPLICATIONS

This application is a divisional of U.S. patent Ser. No. 15/192,851, filed Jun. 24, 2016 and titled COLLAGE OF INTERESTING MOMENTS IN A VIDEO (now U.S. Pat. No. 10,157,638), the contents of which are incorporated herein by reference in their entirety.

BACKGROUND

There are currently one billion smart phones in use and there is potential for seven times the amount of growth in the future. Smart phones are used extensively for capturing and consuming content, like photos and videos. Videos convey more than photos because they capture temporal variation. However, people may be less likely to view videos because not all parts of the video are interesting.

The background description provided herein is for the purpose of genera presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations generally relate to a computer-implemented method to generate a collage. The method includes determining interesting moments in a video. The method further includes generating video segments based on the interesting moments, where each of the video segments includes at least one of the interesting moments from the video. The method further includes generating a collage from the video segments, where the collage includes at least two windows and wherein each window includes one of the video segments.

In some implementations, the operations further include receiving a selection of one of the video segments in the collage and causing the video to be displayed at a time position in the video that corresponds to the selection. In some implementations, determining the interesting moments in the video includes: identifying audio in the video, identifying a type of action associated with the audio in the video, generating an interest score for each type of audio in the video, and determining the interesting moments based on the interest score for each type of audio in the video. In some implementations, determining the interesting moments in the video includes: identifying continual motion in the video, identifying a type of action associated with the continual motion in the video, generating an interest score for each type of action in the video, and determining the interesting moments based on the interest score for each type of action in the video. In some implementations, one or more of the video segments in the collage are configured to play automatically. In some implementations, at least a first segment of the video segments in the collage is configured to play at a different frame rate than other video segments in the collage. In some implementations, determining the interesting moments in the video includes receiving an identification of at least one of the interesting moments from a user and generating video segments based on the interesting moments includes: determining a beginning and an end of continual motion of at least a first object in the video that appears in the video at one of the interesting moments; and cutting the video into a first video segment that includes at least a first frame that corresponds to the beginning of the continual motion and at least a second frame that corresponds to the end of the continual motion. In some implementations, generating video segments based on the interesting moments includes: determining markers that indicate different sections within the video, wherein the markers include at least one of metadata, black frames, white frames, a title card, and a chapter card; and generating video segments that include interesting moments that occur within a single section. In some implementations, generating the collage from the video segments further includes generating graphical data that renders the collage with video segments in windows with different sizes, wherein the sizes of the windows are based on at least one of interest scores for each of the video segments, a length of each of the video segments, and an artistic effect. In some implementations, at least two windows are organized based on a chronology of the video segments.

In some implementations, a computer-implemented method to generate a hierarchical collage includes determining interesting moments in a video. The method further includes generating video segments based on the interesting moments. The method further includes grouping the video segments into groups. The method further includes generating two or more first collages, each of the first collages corresponding to a respective one of the groups and each of the first collages including at least two video segments. The method further includes selecting a representative segment for each of the groups from the at least two video segments of each of the two or more first collages. The method further includes generating a second collage that includes the representative segment for each of the groups, wherein the representative segment in the second collage links to a corresponding first collage that includes the at least two video segments that are included in a corresponding group.

In some implementations, the operations further include receiving a selection of one of the representative segments in the second collage and causing the corresponding first collage to be displayed. In some implementations, wherein grouping the video segments into groups is based on timing of each of the video segments or grouping the video segments into groups is based on a type of interesting moment associated with each of the video segments. In some implementations, the operations further include generating an interest score for each of the interesting moments and where selecting the representative segment for each of the groups is based on the interest score.

Other aspects may include corresponding methods, systems, apparatus, and computer program products.

In some implementations, a method comprises means for determining interesting moments in a video, means for generating video segments based on the interesting moments, wherein each of the video segments includes at least one of the interesting moments from the video, and means for generating a collage from the video segments, wherein the collage includes at least two windows and wherein each window includes one of the video segments.

The system and methods described below advantageously solves the problem of identifying interesting moments in a video by generating a collage that includes video segments of the interesting moments.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Users may be more likely to view a video, e.g., if they can preview interesting moments in videos and/or navigate directly to the interesting moments in the video. A video application described herein determines interesting moments in a video, generates video segments based on the interesting moments, and generates a collage from the video segments that includes the video segments in a single pane. For example, a video may have a first video segment of a child laughing, a second video segment of a dog running after the child, and a third video segment of the child blowing out a birthday cake. The video application may generate a collage that displays short, e.g., two to three seconds long, loops of the first, second, and third video segments. In some implementations, the frame rates of each of the video segments may be different. For example, the first video segment may include a slow-motion video segment, the second video segment may include a fast-motion video segment, and the third video segment may include a regular-speed video segment. When a user selects one of the video segments in the collage, the video application may cause the video to be displayed at a time in the video that corresponds to the selected video segment. For example, if the first video segment occurs at 2:03 minutes into the video, user selection of the first video segment causes the video to play starting at 2:03 minutes.

In some implementations, the video application may generate a hierarchical collage. The video application may determine interesting moments in a video, generate video segments based on the interesting moments, group the video segments into groups, generate one or more first collages based on the groups, select a representative segment for each of the groups, and generate a second collage that includes a representative segment for each of the groups. The groups may be based on timing or a type of interesting moment associated with each of the video segments. Continuing with the example above, a first group could include a first video segment of a child laughing, a second video segment of a dog running after the child, and a third video segment of the child blowing out a birthday cake that all occur in the first third of the video. The video application may generate an interest score for each of the video segments and select the representative segment based on the interest score. For example, the third video segment of the child blowing out the birthday cake may have an interest score indicative of the most interesting video segment and, as a result, the video application may select the third video segment as the representative segment for a first group in the first collage. When a user selects one of the representative segments in the second collage, the video application may cause the first collage to be displayed.

Example System

Figure 1:
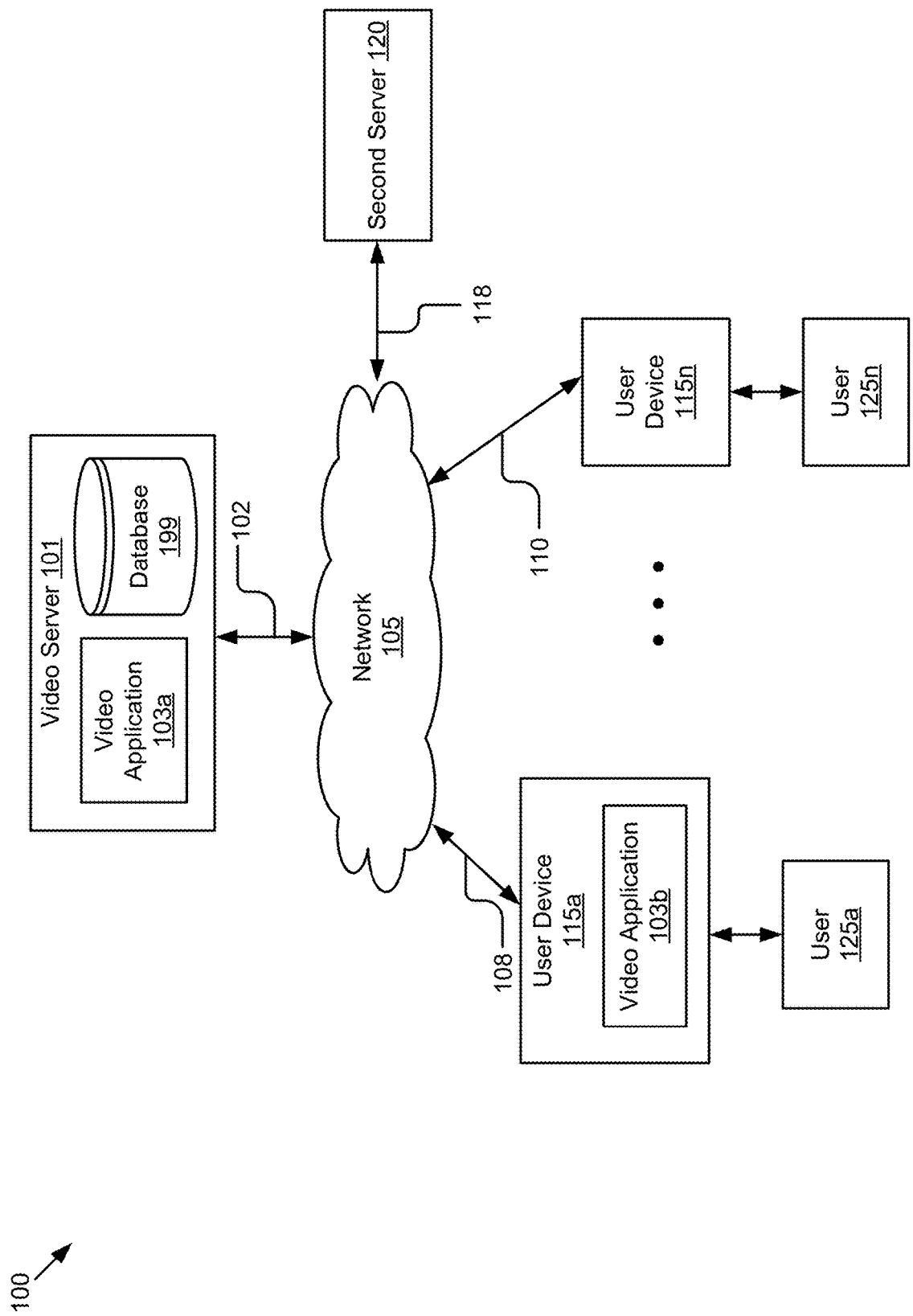
FIG. 1 illustrates a block diagram of an example system that generates collages according to some implementations.

FIG. 1 illustrates a block diagram of an example system 100 that generates collages. The illustrated system 100 includes a video server 101, user devices 115a, 115n, a second server 120, and a network 105. Users 125a, 125n may be associated with respective user devices 115a, 115n. In some implementations, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

The video server 101 may include a processor, a memory, and network communication capabilities. In some implementations, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some implementations, the video server 101 sends and receives data to and from one or more of the user devices 115a, 115n and the second server 120 via the network 105. The video server 101 may include a video application 103a and a database 199.

The video application 103a may be code and routines operable to generate collages. In some implementations, the video application 103a may be implemented using hardware including a field-programmable gate array (FPGA) or an application-specific integrated circuit (ASIC). In some implementations, the video application 103a may be implemented using a combination of hardware and software.

The database 199 may store videos created or uploaded by users 125 associated with user devices 115 and collages generated from the videos. In some implementations, the database 199 may store videos that were generated independent of the user devices 115. The database 199 may also store social network data associated with users 125, information received from the second server 120, user preferences for the users 125, etc.

The user device 115 may be a computing device that includes a memory and a hardware processor, for example, a camera, a laptop computer, a desktop computer, a tablet computer, a mobile telephone, a wearable device, a head-mounted display, a mobile email device, a portable game player, a portable music player, a reader device, a television with one or more processors embedded therein or coupled thereto, or other electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a mobile device that is included in a wearable device worn by the user 125. For example, the user device 115 is included as part of a clip (e.g., a wristband), part of jewelry, or part of a pair of glasses. In another example, the user device 115 can be a smart watch. The user 125 may view images from the video application 103 on a display of the device worn by the user 125. For example, the user 125 may view the images on a display of a smart watch or a smart wristband.

In some implementations, video application 103b may be a standalone application that is stored on the user device 115a. In some implementations, the video application 103 may be stored in part on the user device 115a and in part on the video server 101. For example, the video application 103 may include a thin-client video application 103b stored on the user device 115a and a video application 103a that is stored on the video server 101. The video application 103b stored on the user device 115a may record video that is transmitted to the video application 103a stored on the video server 101 where a collage is generated from the video. The video application 103a may transmit the collage to the video application 103b for display on the user device 115a. In another example, the video application 103b stored on the user device 115a may generate the collage and transmit the collage to the video application 103a stored on the video server 101. The video application 103a stored on the video server 101 may include the same components or different components as the video application 103b stored on the user device 115a.

In some implementations, the video application 103 may be a standalone application stored on the video server 101. A user 125a may access the video application 103 via a web page using a browser or via other software on the user device 115a. For example, the user 125a may upload a video stored on the user device 115a or from another source, such as from the second server 120, to the video application 103, which generates a collage.

The second server 120 may include a processor, a memory, and network communication capabilities. In some implementations, the second server 120 is a hardware server. The second server 120 is communicatively coupled to the network 105 via signal line 118. Signal line 118 may be a wired connection, such as Ethernet, coaxial cable, fiber-optic cable, etc., or a wireless connection, such as Wi-Fi®, Bluetooth®, or other wireless technology. In some implementations, the second server 120 sends and receives data to and from one or more of the video server 101 and the user devices 115a-115n via the network 105.

The second server 120 may provide data to the video application 103. For example, the second server 120 may be a separate server that generates videos that are used by the video application 103 to generate collages. In another example, the second server 120 may be a social network server that maintains a social network where the collages may be shared by a user 125 with other users of the social network. In yet another example, the second server 120 may include video processing software that analyzes videos to identify objects, faces, events, a type of action, text, etc. The second server 120 may be associated with the same company that maintains the video server 101 or a different company.

As long as a user consents to the use of such data, the second server 120 may provide the video application 103 with profile information or profile images of a user that the video application 103 may use to identify a person in an image with a corresponding social network profile. In another example, the second server 120 may provide the video application 103 with information related to entities identified in the images used by the video application 103. For example, the second server 120 may include an electronic encyclopedia that provides information about landmarks identified in the images, an electronic shopping website that provides information for purchasing entities identified in the images, an electronic calendar application that provides, subject to user consent, an event name associated with a video, a map application that provides information about a location associated with a video, etc.

The systems and methods discussed herein do not require collection or e of user personal information. In situations in which certain implementations discussed herein may collect or use personal information about users (e.g., user data, information about a user's social network, user's location, user's biometric information, user's activities and demographic information), users are provided with one or more opportunities to control whether information is collected, whether the personal information is stored, whether the personal information is used, and how the information is collected about the user, stored, and used. That is, the systems and methods discussed herein collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected, and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example Computing Device

Figure 2:
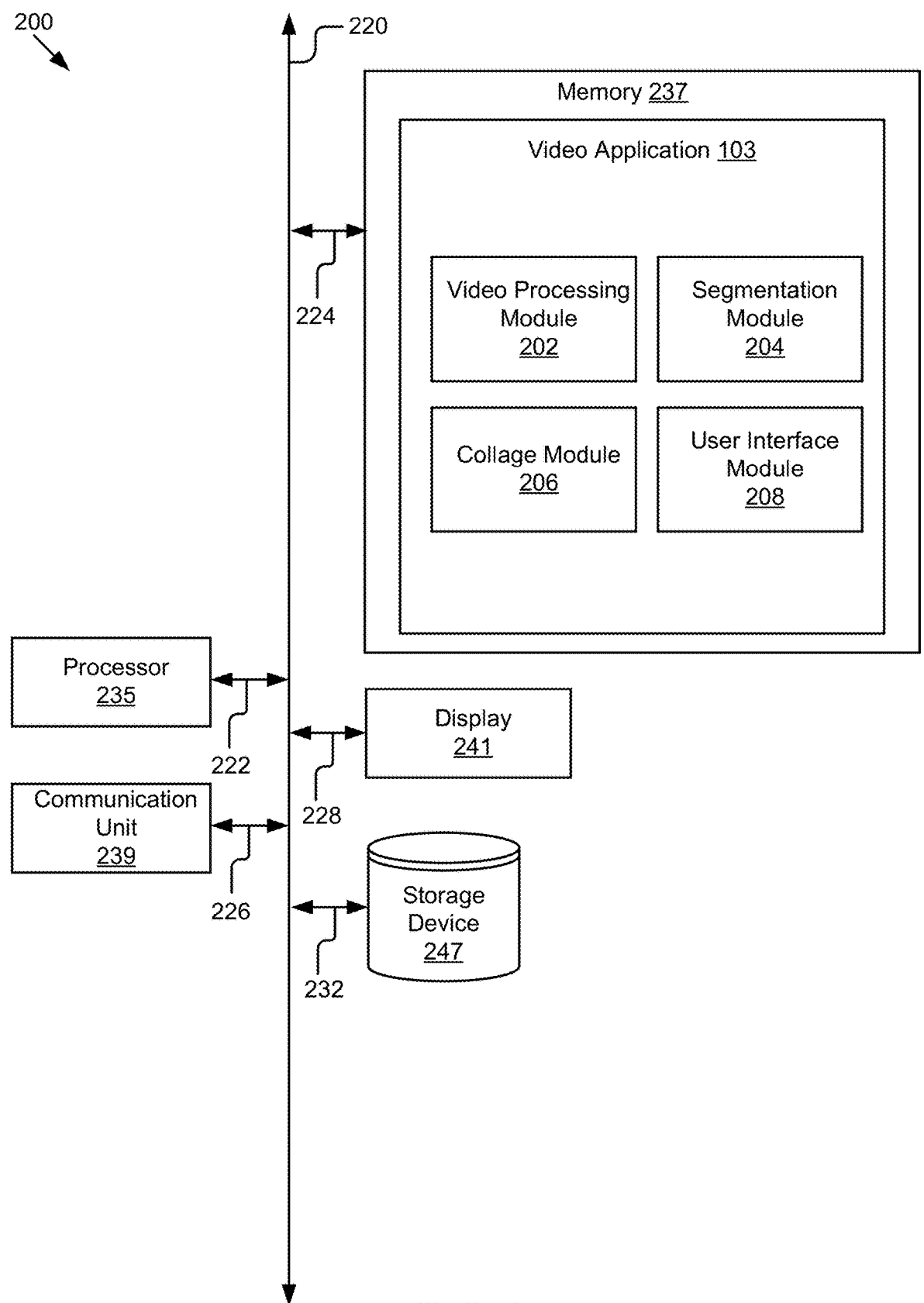
FIG. 2 illustrates a block diagram of an example computing device that generates collages according to some implementations.

FIG. 2 illustrates a block diagram of an example computing device 200 that generates collages. The computing device 200 may be a video server 101 or a user device 115. The computing device 200 may include a processor 235, a memory 237, a communication unit 239, a display 241, and a storage device 247. A video application 103 may be stored in the memory 237. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The communication unit 239 transmits and receives data to and from at least one of the user device 115, the video server 101, and the second server 120 depending upon where the video application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the video server 101, depending on where the video application 103 may be stored. In some implementations, the communication unit 239 includes a wireless transceiver for exchanging data with the user device 115, video server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the video application 103. For example, the display 241 may render graphics to display a collage. The display 241 is coupled to the bus 220 for communication with the other components via signal line 228. Other hardware components that provide information to a user may be included as part of the computing device 200. In some implementations, such as where the computing device 200 is a video server 101, the display 241 may be optional. In some implementations, the computing device 200 may not include all the components. In implementations where the computing device 200 is a wearable device, the computing device 200 may not include storage device 247. In some implementations, the computing device 200 may include other components not listed here, such as one or more cameras, sensors, a battery, etc.

The storage device 247 may be a non-transitory computer-readable storage medium that stores data that provides the functionality described herein. In implementations where the computing device 200 is the video server 101, the storage device 247 may include the database 199 in FIG. 1. The storage device 247 may be a DRAM device, a SRAM device, flash memory or some other memory device. In some implementations, the storage device 247 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 232.

In the illustrated implementation shown in FIG. 2, the video application 103 includes a video processing module 202, a segmentation module 204, a collage module 206, and a user interface module 208. Other modules and/or configurations are possible.

The video processing module 202 may be operable to determine interesting moments in a video. In some implementations, the video processing module 202 may be a set of instructions executable by the processor 235 to determine interesting moments in the video. In some implementations, the video processing module 202 may be stored in the memory 237 of the computing device 200 and can be accessible and executable by the processor 235.

The video processing module 202 may receive a video that includes image frames. The video may be associated with a user. In some implementations, the video processing module 202 may receive a video recorded on the same device 200 where the video application 103 is stored. In some implementations, the video processing module 202 may be stored on a device 200 that is the video server 101 of FIG. 1 and the video processing module 202 may receive the video from the video application 103b stored on the user device 115. In some implementations, the video processing module 202 may receive the video from a second server 120, such as a second server 120 that stores videos such as movies or television shows.

In some implementations, the video processing module 202 determines interesting moments in the video associated with a user. The video processing module 202 may receive an identification of the interesting moments from a user and determine the interesting moments based on the identification. For example, the user interface module 208 may generate a user interface that includes an option for the user to select frames, for example, by clicking on the frames in the video to identify interesting moments. The video processing module 202 may associate metadata with the video that includes time locations for the interesting moments identified by the user. In some implementations, the video processing module 202 may receive an indication of what constitutes an interesting moment from a user. For example, the user may specify that interesting moments include people in the video saying a particular phrase or speaking on a particular topic.

In some implementations, the video processing module 202 determines interesting moments by identifying audio in the video. The video processing module 202 may determine a type of audio in the video. For example, the video processing module 202 may classify the audio as being associated with music, applause, laughter, booing, etc. The video processing module 202 may determine a level of volume of the audio. For example, in a video of a basketball game, an increase in the audio from cheering and/or booing may be associated with an interesting moment, such as a basketball player missing a shot. The video processing module 202 may generate an interest score for each type of motion in the video based on the type of audio. For example, the video processing module 202 may generate an interest score that indicates that the moment is interesting based on a start of music or laughter. The video processing module 202 may generate an interest score that indicates that the moment is not interesting based on a cough or general background noise. The video processing module 202 may determine the interesting moment based on the interest score for each type of audio in the video.

In some implementations, the video processing module 202 determines interesting moments by identifying continual motion in the video and identifying a type of action associated with the continual motion in the video. The video processing module 202 may determine motion by classifying pixels in an image frame as belonging to either a background or a foreground. The video processing module 202 may perform classification on all image frames of the video or a subset of image frames of the video. For example, in some implementations, the subset may include a few or all of intra-coded frames (I-frames) of the video. In some implementations the video processing module 202 identifies the background and the foreground in a subset of the image frames based on a timing of the image frames. For example, the video processing module 202 may perform classification on every third frame in the video. In another example, the video processing module 202 may perform classification on a subset of the frames in the video, e.g., only I-frames, I-frames and a few or all of predicted picture frames (P-frames), etc.

The video processing module 202 may compare the foreground in multiple image frames of the video to identify foreground motion. For example, the video processing module 202 may use different techniques to identify motion in the foreground, such as frame differencing, adaptive median filtering, and background subtraction. This process advantageously identifies motion of objects in the foreground. For example, in a video of a person doing a cartwheel outside, the video processing module 202 may ignore motion that occurs in the background, such as a swaying of the trees in the wind, but the video processing module 202 identifies the person performing the cartwheel because the person is in the foreground.

The video processing module 202 may analyze the video to determine the type of action associated with the continual motion. For example, the video processing module 202 may use a vector based on continual motion to compare the continual motion with continual motion in known videos. The video processing module 202 may use the vector to, subject to user consent, identify a person walking a dog, punching another person, catching a fish, etc. In another example, the video processing module 202 may perform image recognition to identify objects and types of motion associated with the objects in other past videos to identify the action. For example, the video processing module 202 identifies a trampoline and determines that a person is jumping on the trampoline based on trampolines being associated with jumping, a cake being associated with cutting or blowing out a birthday cake, skis being associated with skiing, etc. The video processing module 202 may associate metadata with the video that includes timestamps of when each type of action occurred. For example, the video processing module 202 may generate metadata that identifies a timestamp of each instance of a person riding a scooter in the video.

The video processing module 202 may determine an interesting moment based on the type of action associated with the continual motion. For example, the video processing module 202 may determine that a video includes a user riding a skateboard. In some implementations, the video processing module 202 generates an interest score based on the type of action. Continuing with the above example, the video processing module 202 may generate an interest score that corresponds to the action of skateboarding. In some implementations, the video processing module 202 may assign the interest score based on a quality of the action. For example, the video processing module 202 may assign an interest score that indicates a more interesting moment when the frames with the action include a person with a visible face, frames where the quality of the images is high (e.g., based on a visibility of the action, lighting, blur, stability of the video, etc.), etc.

Upon user consent, the video processing module 202 may generate the interest score based on user preferences. For example, if a user has expressed an interest in skateboarding, the video processing module 202 generates an interest score that indicates that the user finds skateboarding to be interesting. In some implementations, the user provides explicit interests that the video processing module 202 adds to a user profile associated with the user. In some implementations, when the user provides consent to analysis of implicit behavior, the video processing module 202 determines types of actions to add to the user profile based on implicit behavior from the user, such as providing indications of approval for media associated with types of actions.

In some implementations, the video processing module 202 may perform object recognition to identify objects in the video. Upon user consent, the video processing module 202 may perform object recognition that includes identifying a face in the video and determining an identity of the face. The video processing module 202 may compare an image frame of the face to images of people, compare the image frame to other members that use the video application 103, etc. In some implementations, upon user consent, the video processing module 202 may request identifying information from the second server 120. For example, the second server 120 may maintain a social network and the video processing module 202 may request profile images or other images of social network users that are connected to the user associated with the video. In some implementations, upon user consent, the video processing module 202 may employ facial recognition techniques to people in image frames of the video to identify people associated with the faces.

The video processing module 202 may generate metadata that includes an identification of the objects and timestamps of when the objects appear in the video. For example, the metadata may include labels that identify a type of object or person. If the user has provided consent, the video processing module 202 may generate metadata that includes an identification of people in the video and a timestamps of when the people appear in the video. For example, for a video of the user's daughter, the video processing module 202 may generate metadata that identifies each time the daughter appears in the video and timestamps and an identification of objects that the daughter interacts with in the video.

In some implementations, the video processing module 202 generates an interest score based on the identification of a type of object or a person in the video. The video processing module 202 may compare a type of object to a list of positive objects and a list of negative objects that include objects that are commonly recognized as being positive and negative, respectively.

In some implementations, when the user consents to the use of user data, the video processing module 202 assigns the interest score based on personalization information for a user associated with the video. For example, upon user consent, the video processing module 202 maintains a social graph and generates the interest score based on a relationship between the user and a person in the video as identified using the social graph. The video processing module 202 may determine personalization information, subject to user consent, based on explicit information provided by the user, implicit information based on the user's reactions to videos, such as comments provided on video websites, activity in social network applications, etc. In some implementations, the video processing module 202 determines user preferences based on the types of videos associated with the user. For example, the video processing module 202 may determine that the user prefers videos about sports based on the user creating or watching videos that include different types of sports, such as baseball, basketball, etc.

In some implementations, the video processing module 202 may determine an event associated with the video. The video processing module 202 may determine the event based on metadata associated with the video. For example, the metadata may include a date and a location associated with the video. The video processing module 202 may use the date and the location to retrieve information, for example, from a second server 120, about what event occurred at that date and that time. In some implementations, when the user provides consent to use of metadata, the video processing module 202 may use metadata that identifies objects and people in the video to determine the event. For example, the video processing module 202 may determine that the event was a concert based on identifying crowds of people in the video. Certain objects may be associated with certain events, for example, cakes are associated with birthdays and weddings, basketball is associated with a court, etc. In another example, people may be associated with events, such as people wearing uniforms with certain events that occur during school hours, people sitting in pews with a church gathering, people around a table with plates with dinner, etc. The video processing module 202 may generate an interesting score based on the type of event identified in the video.

In some implementations, the video processing module 202 may use additional sources of data to identify the event. For example, the video processing module 202 may determine one or more of the date, the time, and the location where the video was taken based on metadata associated with the video and, upon user consent, request event information associated with the data and the time from a calendar application associated with the user. In some implementations, the video processing module 202 may request the event information from a second server 120 that manages the calendar application. In some implementations, the video processing module 202 may determine the event from publicly available information. For example, the video processing module 202 may use one or more of the date, the time, and the location associated with the video to determine that the video is from a football game. The video processing module 202 may associate metadata with the video that includes identifying information for the event.

The video processing module 202 may transcribe audio in the video to text and identify an interesting moment based on the text. The video processing module 202 may generate metadata that identifies a timestamp for each instance where a user spoke a certain word. For example, where the video is from speeches given at a conference on cloud computing, the video processing module 202 may identify a timestamp for each location where a speaker said "the future." In some implementations, the video processing module 202 may use the audio as an indication of an interesting moment. For example, for sports events or other competitions, the video processing module 202 may identify when a crowd starts cheering and identify continual motion that occurred right before the cheering as including an interesting moment.

The video processing module 202 may determine whether the interest score meets or exceeds a threshold segmentation value. If a portion of the video includes an interest score that meets or exceeds the threshold segmentation value, the video processing module 202 may instruct the segmentation module 204 to generate a video segment that includes the interesting moment. Portions of the video that fail to meet or exceed the threshold segmentation value may not be identified as including an interesting moment.

The video processing module 202 may apply interest scores that are on a scale, such as from 1 to 10. The interest score may be based on a combination of factors identified in the portion of the video. For example, the video processing module 202 may generate an interest score that is based on a portion of the video including an event, an object, and a person.

In some implementations, the video processing module 202 may receive feedback from a user and modify the user profile so that the interest score is modified accordingly. For example, if a user provides an indication of approval (e.g., a thumbs up, a +1, a like, saving a collage to the user's media library, etc.) of a collage that includes a video on new types of wearables, the video processing module 202 may add wearables in a list of positive objects. In another example, the user may explicitly state that the user enjoys collages where the event type is a rock show. The video processing module 202 may update personalization information associated with the user, such as a user profile, to include the rock show as a preferred event type. In some implementation, the feedback includes an indication of disapproval (a thumbs down, a −1, a dislike, etc.). In some implementations, the indications of approval and/or disapproval are determined based on comments provided by a user. In some implementations, the feedback includes an identification of a person, an object, or a type of event that the user wants to be included in the collage.

The segmentation module 204 may be operable to segment the video into video segments based on interesting moments. In some implementations, the segmentation module 202 may be a set of instructions executable by the processor 235 to segment the video. In some implementations, the segmentation module 202 may be stored in the memory 237 of the computing device 200 and can be accessible and executable by the processor 235.

In some implementations, the segmentation module 204 generates video segments that include interesting moments. In some implementations where the interesting moment is associated with continual motion, the segmentation module 204 may generate a video segment that includes a beginning and an end of the continual motion. The segmentation module 204 may identify a start and an intermediate endpoint of continual motion within the segment and pick a sub-segment that includes both these points. For example, if the video is of a girl doing multiple cartwheels, the start point may be the start of a first cartwheel and the intermediate end point may be the end of the first cartwheel. In another example, the segmentation module 204 may identify a segment based on different types of motion. For example, a first sub segment may be a cartwheel and a second subsegment may be a jumping celebration.

In some implementations, the segmentation module 204 may generate a video segment that is one to three seconds long. The segmentation module 204 may determine how to generate the segment based on including at least a particular number of interesting moments. For example, the segmentation module 204 may generate a video segment that encompasses a first interesting moment that includes a particular object in a first set of frames, a second interesting moment that includes continual motion in a set of second frames, and a third interesting moment that includes a particular person in a third frame.

In some implementations, the segmentation module 204 may generate a video segment that includes multiple frames at different time periods in the video. For example, the segmentation module 204 may generate a video segment that includes multiple instances where people at a conference say "cloud computing" at different time periods in the video.

In some implementations, the segmentation module 204 generates video segments based on a theme. In instances where a user specifies that interesting moments include a type of action, the segmentation module 204 generates a video segment that includes the interesting moments as identified by the video processing module 202. For example, the segmentation module 204 generates a video segment that includes some or all instances where a person is riding a scooter in the video. The segmentation module 204 may select a number of instances of action to include in the video segment based on the interesting scores. The segmentation module 204 may rank the interesting moments based on their corresponding interesting scores and select a number of the interesting moments based on a length of the video segment, e.g., three seconds, five seconds, twenty seconds, etc. For example, the segmentation module 204 may select the top five most interesting moments based on the ranking because the total length of the five most interesting moments is under 20 seconds.

In some implementations, the segmentation module 204 determines markers that indicate different sections within the video and generate video segments that include interesting moments that occur within the sections. The sections may include different acts or scenes in a movie, different news segments in a news reporting show, different videos in a show about people filming dangerous stunts on video, etc. The markers may include metadata that indicate a start and an end of each section, black frames, white frames, a title card, a chapter card, etc. For example, the segmentation module 204 may generate three video segments for a movie where the three video segments represent the three acts in the movie and each video segment includes interesting moments cut from the corresponding act.

In some implementations, the segmentation module 204 verifies that the video segments are different from each other. For example, the segmentation module 204 may determine that each video segment includes different objects so the collage does not include video segments that look too similar.

The collage module 206 may be operable to generate a collage from the video segments. In some implementations, the collage module 206 can be a set of instructions executable by the processor 235 to provide the functionality described below for generating the collage. In some implementations, the collage module 206 can be stored in the memory 237 of the computing device 200 and can be accessible and executable by the processor 235.

In some implementations, the collage module 206 receives video segments from the segmentation module 204. In some implementations, the collage module 206 may retrieve the selected video segments from the storage device 247.

The collage module 206 may generate a collage from the video segments where the video segments are displayed in a single pane. The collage may take many forms. For example, the collage module 206 may generate a collage when at least two video segments are available. In another example, the collage module 206 may generate a collage when at least four video segments are available. The video segments may be displayed in square windows, in portrait windows (e.g., if the video segment is shot in portrait mode), in a landscape window (e.g., if the video is shot in landscape mode), and with different aspect ratios (e.g., 16:9, 4:3, etc.). In some implementations, the collage module 206 may configure the aspect ratios and orientations based on the user device 115 that is used to view the collage. For example, the collage module 206 may use a 16:9 aspect ratio for high-definition televisions, a 1:1 aspect ratio for square displays or viewing areas, a portrait collage for a user device 115 in a portrait orientation, and a wide collage (e.g., 100:9) for wearables such as augmented reality and virtual reality displays.

The collage module 206 may combine a predetermined number of video segments to form the collage. For example, the collage module 206 may rank the video segments from most interesting to least interesting based on the interest scores and generate a collage based on the predetermined number of video segments that are the most interesting. In some implementations, the collage module 206 may select video segments for the collage with interest scores that meet or exceed a predetermined collage value.

In some implementations, the collage module 206 processes the video segments. For example, the collage module 206 may convert the video segments to high dynamic range (HDR), black and white, sepia, etc.

The collage module 206 may layout and/or order the video segments based on at least one of chronology, the interest scores, visual similarity, color similarity, and a length of time of each segment. Ordering the collage based on chronology may include the first video segment corresponding to the earliest time in the video, the second video segment corresponding to the segment earliest time, etc. The collage module 206 may order the video segments based on the interest scores by ranking the video segments from most interesting to least interesting based on the interest scores and order the collage based on the ranking. The collage module 206 may arrange the video segments in a clockwise direction, a counterclockwise direction, or an arbitrary direction. Other configurations are possible.

In some implementations, the collage module 206 generates instructions for the user interface module 208 to generate graphical data that renders the collage with video segments in windows with different sizes. The size of the windows may be based on interest scores for each of the video segments. For example, the video segment with an interest score that indicates that it is most interesting may have the largest window size. Additionally or alternatively the size of the windows may be based on a length of the video segments. For example, the shortest video segment may correspond to the smallest window size. In some implementations, the collage module 206 may determine window size based on an artistic effect. For example, the collage module 206 may generate windows that resemble artistic works from the De Stijl art movement. In particular, the collage module 206 may generate a collage with shapes that resemble a Piet Mondrian painting with different sized boxes and different line thicknesses that distinguish the separation between different video segments.

The collage module 206 may link the video segments to a location in the video such that upon receiving a selection of one of the video segments, the video is displayed at a time in the video that corresponds to the selection. For example, each video segment in the collage may include a hyperlink to the corresponding location in the video. In some implementations, the collage module 206 generates a collage that is a video file (e.g., an animated GIF, an MPG, etc.) with associated code (e.g., JavaScript) that recognizes user selection (e.g., to move to a second collage in a hierarchy, to play back a certain segment, etc.).

In some implementations, the collage module 206 generates and displays a collage by determining a number of video segments that meet a threshold score, determining display characteristics for the collage, identify one or more window layouts that meet the display characteristics, select a particular window layout, generate the collage, and cause the collage to be displayed.

Figure 3:
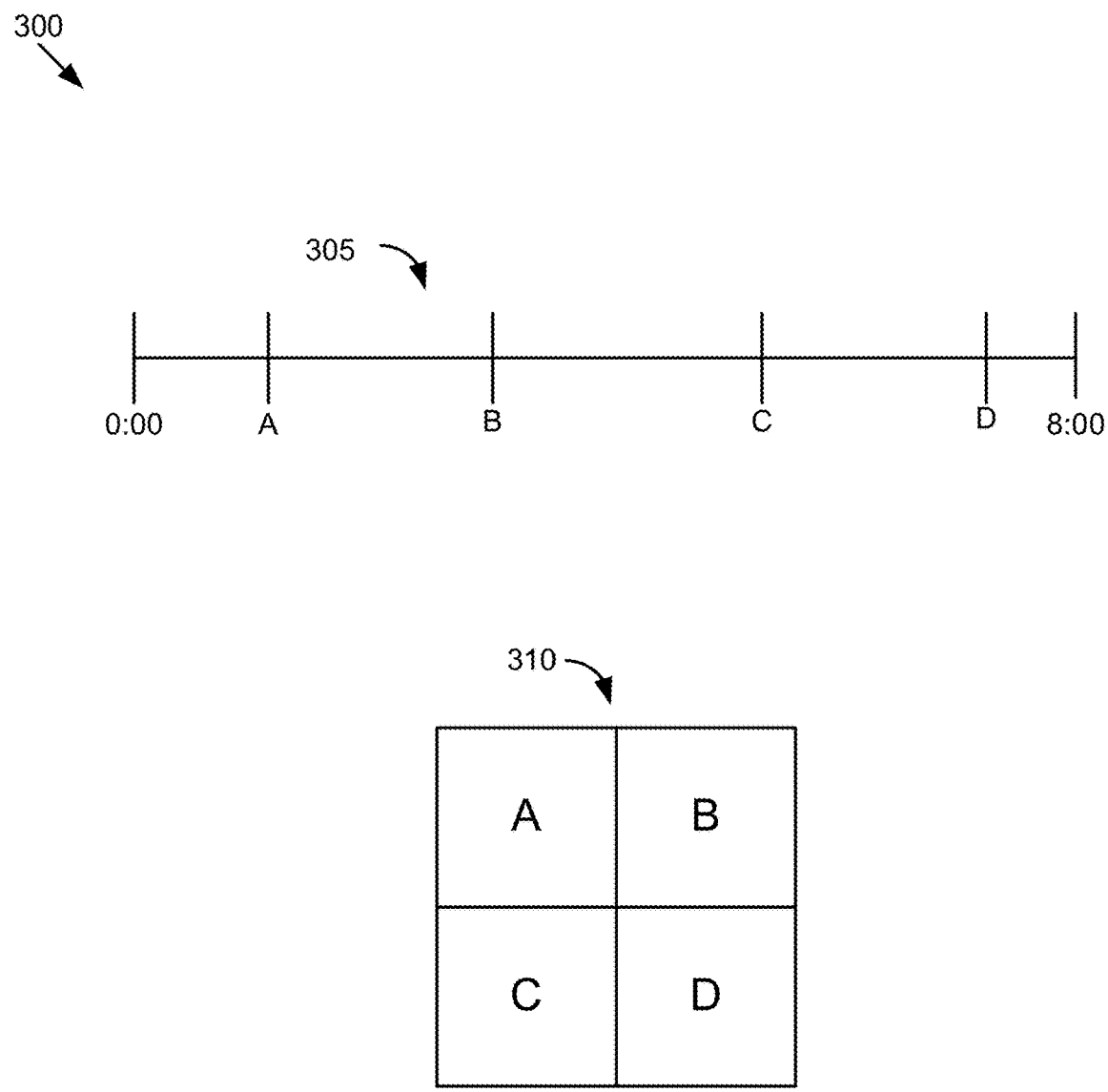
FIG. 3 illustrates a graphic representation of an example timeline and a corresponding collage according to some implementations.

Turning to FIG. 3, a graphic representation 300 is illustrated. The graphic representation 300 includes an example timeline 305 of a video and a corresponding collage 310 generated from four interesting moments. The timeline 305 represents an eight-minute video. The eight-minute video may be of an ice skating competition where four different ice skating couples each have a two-minute demonstration. In this example, the video processing module 202 identified four interesting moments that are labelled as A, B, C, and D.

In this example, the segmentation module 204 generates four video segments where each video segment includes a corresponding interesting moment. The video processing module 202 may determine the interesting moments based on a user identifying the interesting moments, based on identifying continual motion, for example, motion that occurs before the crowd starts cheering, or another technique. Interesting moment A may include a first couple executing a sustained edge step, interesting moment B may include a second couple where one of the skaters executes a triple axel jump, interesting moment C may include a third couple executing the sustained edge step, and interesting moment D may include a fourth couple executing a serpentine step sequence.

The collage module 206 generates a collage from the video segments. In this example, the collage module 206 generates a collage that orders the video segments chronologically in a clockwise direction. If a user selects one of the video segments, the user interface module 208 may cause the video to be displayed at the location in the video that corresponds to the time of the video segment. For example, in the example depicted in FIG. 3, if a user selects video segment D, a new window may appear that displays the video at the D location illustrated on the timeline 305 near the end of the video.

Figure 4:
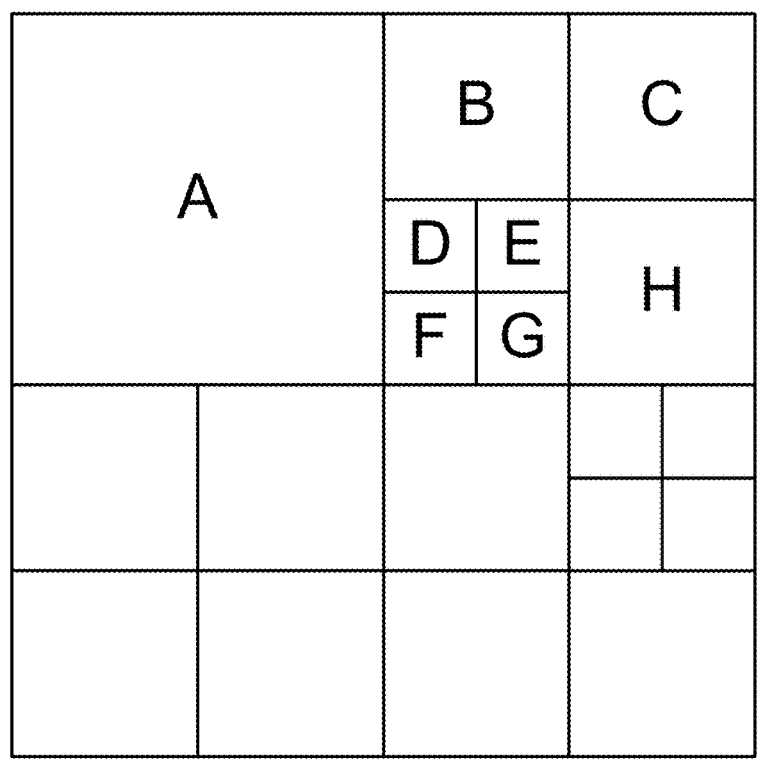
FIG. 4 illustrates a graphic representation of another example collage according to some implementations.

FIG. 4 illustrates a graphic representation of another example collage 400 according to some implementations. In this example, the collage includes 19 video segments. The collage module 206 may generate the different sized windows for the collage based on the interest scores for each of the video segments and the length of the video segments. For example, FIG. 4 may represent a collage generated from a video of a news program. Video segment A may represent the feature news story for the news program, which is both the most interesting and the longest. As a result, video segment A is represented with the largest window. Video segments B, C, and H represent other less interesting and shorter news segments. Lastly, video segments D, E, F, and G represent short snippets in the news program.

In some implementations, the collage module 206 generates a hierarchical collage. Hierarchical collages may be useful, for example, to present a limited number of video segments in a single window. In addition, the hierarchical collage may create an entertaining effect that helps users stay more engaged when there are so many video segments that it would look too crowded to the user. The collage module 206 may group the video segments into a group based on timing of the video segments or a type of interesting moment associated with the video segments. The collage module 206 may generate one or more first collages based on the groups. For example, the collage module 206 may divide a video into three parts and generate the one or more first collages for each of the video segments in the first part, the second part, and the last part of the video. In another example, a video may include tryouts and competitions. The collage module 206 may group based on the type of interesting moment by distinguishing between tryouts and competitions. The collage module 206 may generate two first collages, one first collage for the video segments in the tryouts and one first collage for the video segments in the competitions. In some implementations, the representative segment may be the longest video segment for a group. In some implementations, the representative segment may be a segment that includes a high amount of continual motion compared with other segments in the group. In some implementations, a combination of interest score, length of segment, amount of continual motion, etc. may be used to select the representative segment.

The collage module 206 may select a representative segment for each of the groups from the video segments associated with each of the one or more first collages. The representative segment may be based on the interest score for each of the video segments in the group. For example, continuing with the above example of a group of tryouts and a group of competitions, the collage module 206 may select the most interesting tryout video segment to be the representative segment for the tryout group.

The collage module 206 may generate a second collage that includes the representative segment for each of the groups. In some implementations, the representative segments link to each of the corresponding one or more first collages such that selection of one of the representative segments causes the corresponding first collage to be visible. The collage module 206 may instruct the user interface module 208 to generate graphical data that causes the second collage to open to display the corresponding first collage, to replace the second collage with the first collage, or to causes all of the one or more first collages to be displayed.

In some implementations, the collage module 206 configures the video segments in the collage to play automatically. Alternatively or additionally, the collages may have to be selected to play. The video segments may play at once or sequentially such that a first video segment plays, then a second video segment plays, etc. The video segments may play once or be configured to play on a continuous loop. In some implementations, a user may be able to configure automatic playback or other options as system settings.

In some implementations, the collage module 206 configures the video segments to play at different frame rates. For example, video segment A may play at the standard speed of 24 FPS (frames per second), video segment B may play at a slower speed of 16 FPS, video segment C may play at a faster speed of 50 FPS, and video segment D may play at 24 FPS. In some implementations, the collage module 206 selects the frame rate based on the content of the video segment. For example, the collage module 206 may select a slow frame rate for video segments when the rate of continual motion in the video segment is high, such as a video segment of a pitcher throwing a baseball. The collage module 206 may select a faster frame rate when the rate of continual motion in the segment is low, such as a video segment of a person blowing out a candle or cutting a cake.

Figure 5:
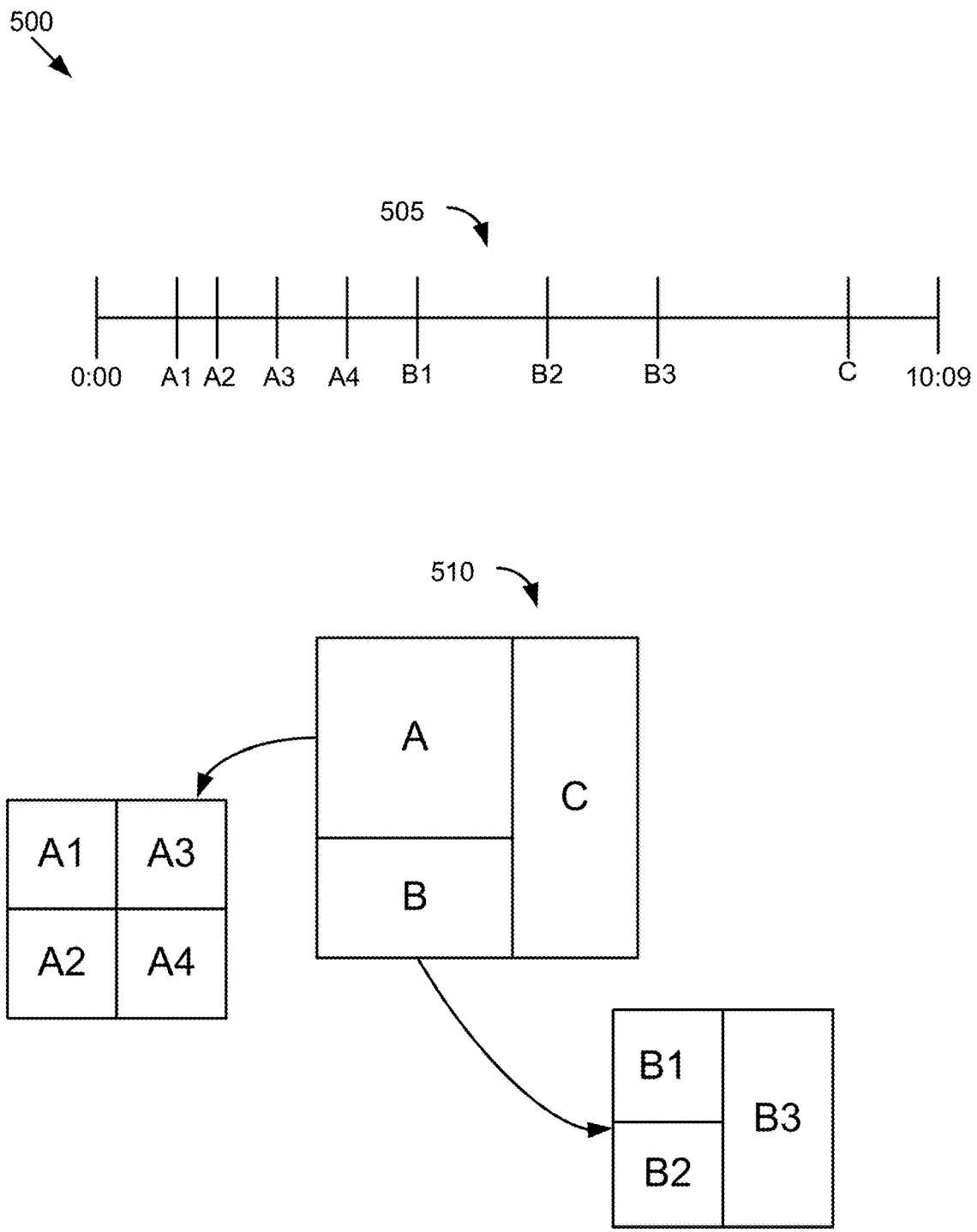
FIG. 5 illustrates a graphic representation of an example hierarchical collage according to some implementations.

Turning to FIG. 5, a graphic representation 500 is illustrated of an example timeline 505 and a hierarchical collage 510 according to some implementations. For example, the timeline 505 represents a video of a meeting that includes presenters giving talks, attendees forming discussion groups, and closing remarks being presented. The collage module 206 groups the video segments into three groups: group A represents a section where presenters talk, group B represents a section where people form discussion groups, and group C represents closing remarks. The collage module 206 generates two first collages: one for group A that includes four video segments and one for group B that includes three video segments. The collage module 206 generates a second collage that includes representative segments for the two first collages and the video segment for group C. The second collage may include a representative segment from each of the groups A, B, and C.

If a user selects the representative segment for group A, the user interface module 208 causes a user interface to display the first collage for group A, which includes video segments A1, A2, A3, and A4. If the user selects video segment A3, it causes the user interface to display the video at the location that corresponds to A3 in the timeline 505.

The user interface module 208 may be operable to provide information to a user. In some implementations, the user interface module 208 can be a set of instructions executable by the processor 235 to provide the functionality described below for providing information to a user. In some implementations, the user interface module 208 can be stored in the memory 237 of the computing device 200 and can be accessible and executable by the processor 235.

The user interface module 208 may receive instructions from the other modules in the video application 103 to generate graphical data operable to display a user interface. For example, the user interface module 208 may generate a user interface that displays a collage created by the collage module 206.

The user interface module 208 may generate graphical data to display collages that include a link to the full video such that, responsive to a user clicking on the collage the user interface may display the original video or cause a new webpage to open that includes the full video. In some implementations, the user interface module 208 provides an option to download the collage to a user device 115 or stream the collage from the video server 101.

In some implementations, the user interface module 208 may generate an option for a user to provide feedback on the collages. For example, the user interface module 208 may generate a user interface that includes a feedback button that the user can select to view a drop-down menu that includes objects that the user wants to add as explicit interests. The user interface module 208 may provide the objects based on labels associated with the one or more video segments used to create the list of objects that the user may select as explicit interests.

Figure 6:
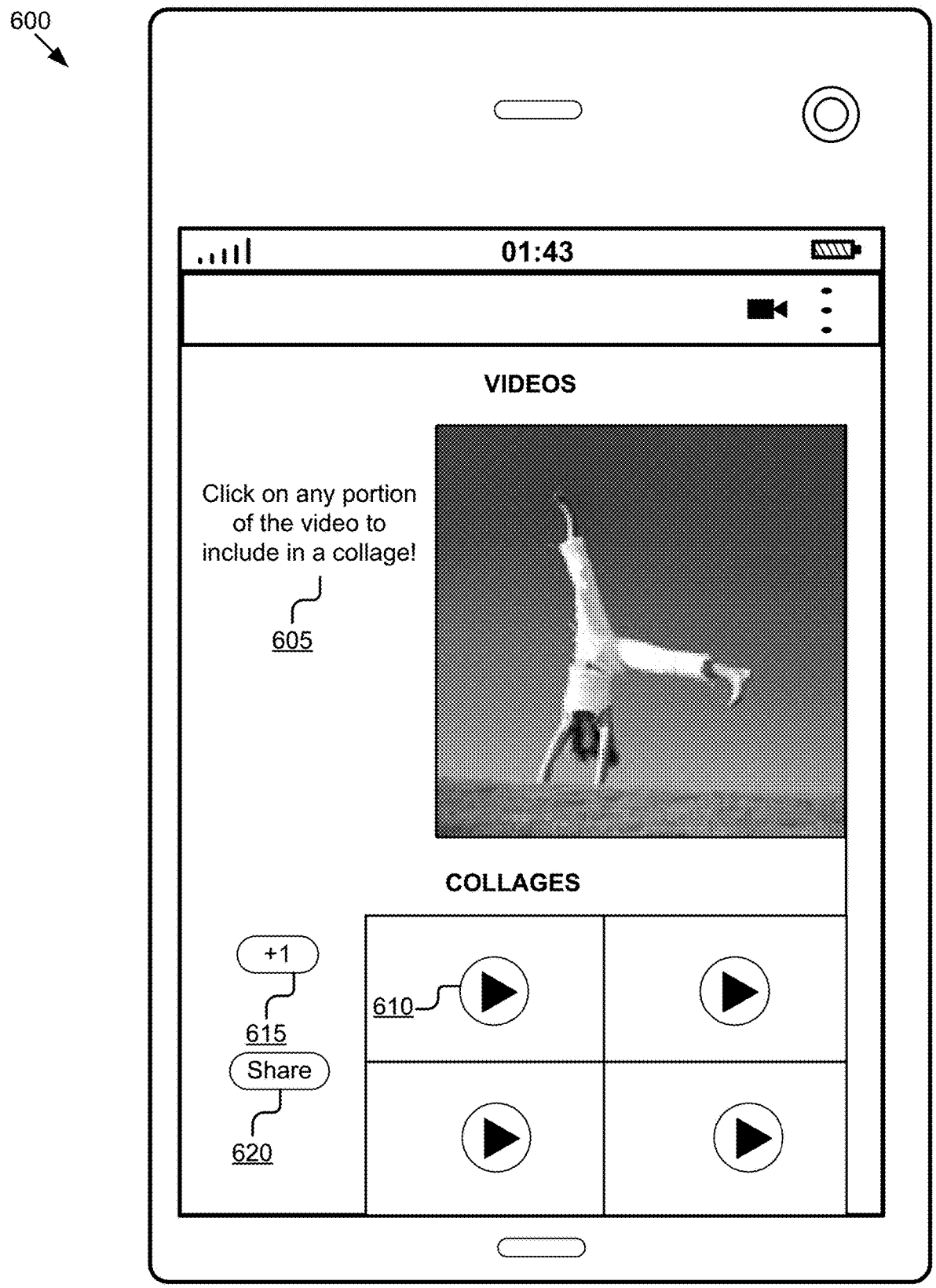
FIG. 6 illustrates a graphic representation of an example user interface that receives a designation of an interesting moment from a user.

FIG. 6 illustrates a graphic representation of an example user interface 600 that includes a videos section. In the videos section, the user interface module 208 may receive a designation of an interesting moment from a user. In this example, the user interface module 208 includes instructions 605 that inform the user that the user can identify interesting moments by clicking on the video. As a result of the user selection, the video segment module 204 generates a video segment that includes the interesting moment and the collage module 206 generates a collage that includes the video segments.

FIG. 6 also includes a collages section that includes a collage. In this example, the user selects one of the playback buttons 610 to view a corresponding video segment. The user interface 600 also includes an option for indicating approval of the video in the form of a +1 button 615 and a share button 615 that allows the user to share the collage. For example, the user interface module 208 may generate an option for sharing the collage via a social network, using email, via a chat application, etc.

Example Method

Figure 7:
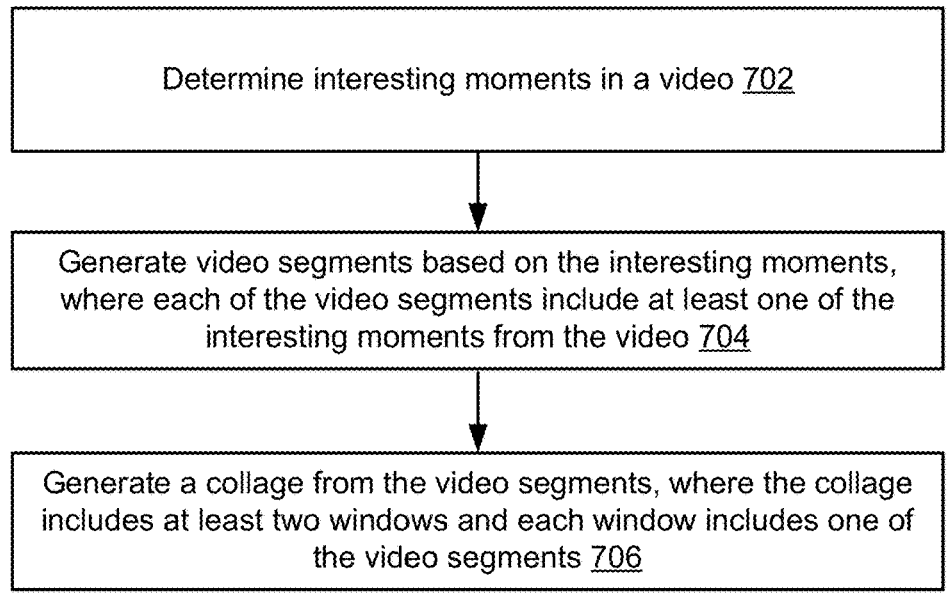
FIG. 7 illustrates a flowchart of an example method to generate a collage according to some implementations.

FIG. 7 illustrates a flowchart of an example method 700 to generate a collage according to some implementations. In some implementations, the steps in FIG. 7 may be performed by the video application 103 of FIG. 1 and/or FIG. 2.

At block 702, interesting moments are determined in a video. For example, a user identifies the interesting moments or the interesting moments are determined based on continual motion, objects in the video, etc. At block 704, video segments are generated based on the interesting moments, where each of the video segments include at least one of the interesting moments from the video. At block 706, a collage is generated from the video segments, where the collage includes at least two windows and each window includes one of the video segments.

While blocks 702 to 706 are illustrated in a particular order, other orders are possible with intervening steps. In some implementations, some blocks may be added, skipped, or combined.

Figure 8:
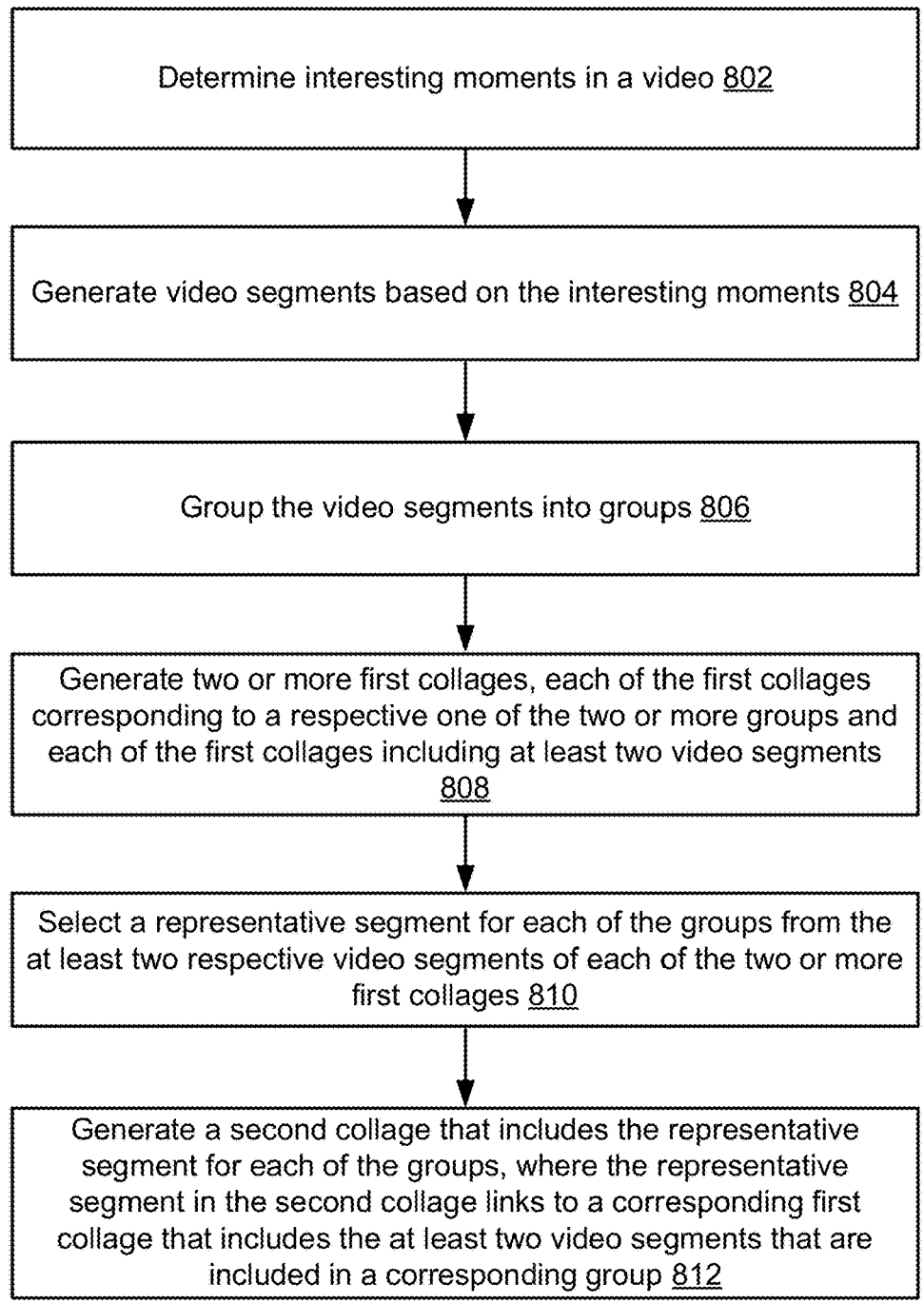
FIG. 8 illustrates a flowchart of an example method to generate a hierarchical collage according to some implementations.

FIG. 8 illustrates a flowchart of an example method 800 to generate a hierarchical collage according to some implementations. In some implementations, the steps in FIG. 8 may be performed by the video application 103 of FIG. 1 and/or FIG. 2.

At block 802, interesting moments are determined in a video. At block 804, video segments are generated based on the interesting moments. At block 806, the video segments are grouped into groups. At block 808, two or more first collages are generated, each of the first collages corresponding to a respective one of the two or more groups and each of the first collages including at least two video segments. At block 810, a representative segment is selected for each of the groups from the at least two respective video segments of each of the two or more first collages. At block 812, a second collage is generated that includes the representative segment for each of the groups, where the representative segment in the second collage links to a corresponding first collage that includes the at least two video segments that are included in a corresponding group.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession; a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method to generate a hierarchical collage, the method comprising:
    determining interesting moments in a video;

generating video segments that each include a respective interesting moment, wherein each of the video segments includes a sequence of image frames with a start time and an end time;
grouping the video segments into groups;
generating two or more first collages, each of the first collages corresponding to a respective one of the groups and each of the first collages including at least two video segments;
selecting a representative segment for each of the groups from the at least two video segments of each of the two or more first collages;
generating a second collage that includes the representative segment for each of the groups, wherein the representative segment in the second collage links to a corresponding first collage that includes the at least two video segments that are included in a corresponding group and each of the at least two video segments includes the sequence of image frames that are associated with the respective interesting moment;
receiving a selection of one of the representative segments in the second collage; and
causing the corresponding first collage to be displayed with the representative segment for the respective one of the groups and representative segments for other video segments that are in the at least two video segments for the corresponding one of the first collages, wherein the corresponding first collage is displayed without displaying other collages of the two or more first collages.

2. The method of claim 1, further comprising:
receiving a selection of the representative segment for the respective one of the groups; and
causing the video to play at a location that corresponds to the representative segment.

3. The method of claim 1, wherein grouping the video segments into groups is based on timing of each of the video segments.

4. The method of claim 1, wherein the interesting moments are determined based on identifying continual motion in the video.

5. The method of claim 1, further comprising:
generating an interest score for each of the interesting moments; and
wherein selecting the representative segment for each of the groups is based on the interest score.

6. The method of claim 5, wherein a largest window size corresponds to a highest interest score.

7. The method of claim 1, wherein determining the interesting moments in the video includes:
identifying audio in the video;
identifying a type of audio in the video;
generating a respective interest score for two or more instances of audio in the video based on the type of audio; and
determining the interesting moments based at least in part on corresponding interest scores.

8. A non-transitory computer storage medium encoded with a computer program, the computer program comprising instructions that, when executed by one or more computers, cause the one or more computers to perform operations to generate a hierarchical collage, the operations comprising:
determining interesting moments in a video;
generating video segments that each include a respective interesting moment, wherein each of the video segments includes a sequence of image frames with a start time and an end time;
grouping the video segments into groups;
generating two or more first collages, each of the first collages corresponding to a respective one of the groups and each of the first collages including at least two video segments;
selecting a representative segment for each of the groups from the at least two video segments of each of the two or more first collages;
generating a second collage that includes the representative segment for each of the groups, wherein the representative segment in the second collage links to a corresponding first collage that includes the at least two video segments that are included in a corresponding group and each of the at least two video segments include includes the sequence of image frames that are associated with the respective interesting moment;
receiving a selection of one of the representative segments in the second collage; and
causing the corresponding first collage to be displayed with the representative segment for the respective one of the groups and representative segments for other video segments that are in the at least two video segments for the corresponding one of the first collages, wherein the corresponding first collage is displayed without displaying other collages of the two or more first collages.

9. The computer storage medium of claim 8, wherein the operations further include:
receiving a selection of the representative segment for the respective one of the groups; and
causing the video to play at a location that corresponds to the representative segment.

10. The computer storage medium of claim 8, wherein grouping the video segments into groups is based on timing of each of the video segments.

11. The computer storage medium of claim 8, wherein grouping the video segments into groups is based on a type of interesting moment associated with each of the video segments.

12. The computer storage medium of claim 8, wherein the operations further include:
generating an interest score for each of the interesting moments; and
wherein selecting the representative segment for each of the groups is based on the interest score.

13. The computer storage medium of claim 12, wherein a largest window size corresponds to a highest interest score.

14. The computer storage medium of claim 8, wherein determining the interesting moments in the video includes:
identifying audio in the video;
identifying a type of audio in the video;
generating a respective interest score for two or more instances of audio in the video based on the type of audio; and
determining the interesting moments based at least in part on corresponding interest scores.

15. A system to generate a hierarchical collage, the system comprising:
one or more hardware processors; and
a memory that stores instructions that, when executed by the one or more hardware processors, causes the one or more hardware processors to perform operations comprising:
determining interesting moments in a video;
generating video segments that each include a respective interesting moment, wherein each of the video segments includes a sequence of image frames with a start time and an end time;

grouping the video segments into groups;

generating two or more first collages, each of the first collages corresponding to a respective one of the groups and each of the first collages including at least two video segments;

selecting a representative segment for each of the groups from the at least two video segments of each of the two or more first collages;

generating a second collage that includes the representative segment for each of the groups, wherein the representative segment in the second collage links to a corresponding first collage that includes the at least two video segments that are included in a corresponding group and each of the at least two video segments includes the sequence of image frames that are associated with the respective interesting moment;

receiving a selection of one of the representative segments in the second collage; and causing the corresponding first collage to be displayed with the representative segment for the respective one of the groups and representative segments for other video segments that are in the at least two video segments for the corresponding one of the first collages, wherein the corresponding first collage is displayed without displaying other collages of the two or more first collages.

16. The system of claim 15, wherein the instructions further cause the one or more hardware processors to perform operations comprising:

receiving a selection of the representative segment for the respective one of the groups; and causing the video to play at a location that corresponds to the representative segment.

17. The system of claim 15, wherein grouping the video segments into groups is based on timing of each of the video segments.

18. The system of claim 15, wherein grouping the video segments into groups is based on a type of interesting moment associated with each of the video segments.

19. The system of claim 15, wherein the instructions further cause the one or more hardware processors to perform operations comprising:

generating an interest score for each of the interesting moments; and wherein selecting the representative segment for each of the groups is based on the interest score.

20. The system of claim 19, wherein a largest window size corresponds to a highest interest score.

* * * * *